Patented Aug. 15, 1933

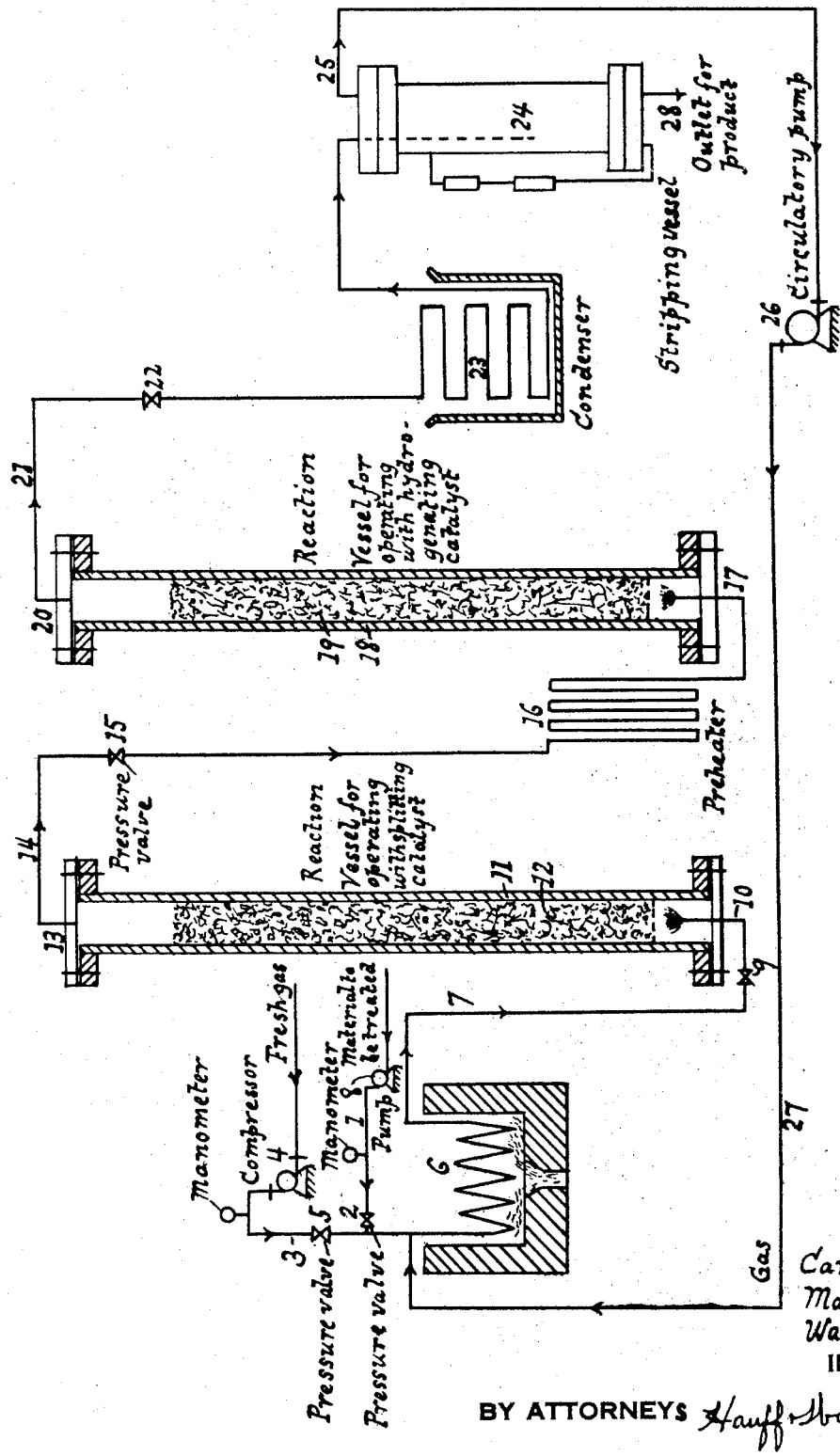

1,922,542

UNITED STATES PATENT OFFICE 1,922,542

DESTRUCTIVE HYDROGENATION OF CARBONACEOUS MATERIALS

Carl Krauch, Ludwigshafen - on - the - Rhine, Mathias Pier, Heidelberg, and Walter Simon, Ludwigshafen - on - the - Rhine, Germany, assignors, by mesne assignments, to Standard-I. G. Company, Linden, N. J., a Corporation of Delaware Application June 20, 1927, Serial No. 200,282, and in Germany June 29, 1926

5 Claims. (Cl. 196—53)

It is already known that valuable hydrocarbons, especially such of low boiling point, may be produced from hydrocarbon products, such as various kinds of coal, tars, mineral oils, pitches, bitumens, asphaltums, their distillation and conversion products and residues, and the like, by means of hydrogen at an elevated temperature and under pressure. It is also known that the presence of catalysts which facilitate the reaction, results in increased yields, especially in respect of hydrocarbons of low boiling point and their derivatives such as benzines, benzene and homologues of the same.

We have found that particularly high yields of valuable products, especially those of low boiling point, may be obtained if the initial materials are first treated at an elevated temperature and preferably under elevated pressure, in the presence of hydrogen or gases containing it with catalysts which assist splitting or cracking, and subsequently with different catalysts which tend more to facilitate hydrogenation. According to this method of operating the working conditions may be so extensively modified as to adapt them in the most favorable manner to the materials to be improved and the final product desired. Moreover, the temperature may be kept comparatively low, especially when the products to be improved are treated in the liquid condition, and by this means an undesirable, too great acceleration of the reaction, which usually leads to the formation of methane and coke, is prevented.

The splitting or cracking catalysts comprise, for example, the solid substances selected from the class consisting of elements of groups 4 and 3 of the periodic system such as aluminum and silicon (see Funk & Wagnall's New Standard Dictionary, volume 2, page 1838) copper-iron mixtures or mixtures of compounds of the same, porous carbon, especially active charcoal, calcined wood charcoal, active silica, hydrosilicates, alumina, magnesia, and the like. The hyrogenizing catalysts comprise for example cobalt, molybdenum, tungsten, compounds of same, and the like.

The method of operation herein described offers special advantages over the simultaneous employment of cracking and hydrogenation contact masses, inasmuch as many excellent cracking catalysts, such as active charcoal, suffer a loss of efficiency when used in conjunction with hydrogenating catalysts.

On the other hand, substances which possess both cracking and hydrogenating efficiency such as tungsten, often lose their cracking efficiency when further hydrogenating compounds such as nickel are added thereto.

According to the present process, it is easy to produce, for example, a benzine of a definite degree of saturation with hydrogen from a middle oil. Both the splitting or cracking and the hydrogenation may be effected with the materials under treatment in the form of vapor, for example in the conversion of middle oils into benzines. The said materials may, however, also be used in the liquid condition, as for example, when it is desired to convert pitches and asphaltums into middle oils. A suitable selection of the splitting or cracking catalysts, temperature, hydrogen pressure and vapor tension of the initial material entirely or substantially so prevents the occurrence of undesired secondary reactions, such as the formation of coke and of methane.

When coal is being treated, it may be employed in the solid state, with the addition of splitting or cracking catalysts, without suspending it as usual in oils or the like.

In many cases the hydrogenation treatment is effected at a different temperature from the splitting or cracking treatment. The two stages may be carried out in succession in the same chamber or in separate chambers, and each of them may be performed repeatedly.

The temperatures employed range between about 300° and 700° C. The most suitable temperature for the cracking treatment is generally between about 400° and 700° C. and that for the hydrogenation stage 300° to 600° C. The most favorable temperature to be employed depends considerably on the material to be treated and may in some cases even be outside the limits indicated above. It is preferable to carry out the operation at least in the second stage under elevated pressure and such pressure may amount to 20, 50, 100 or still more atmospheres. The use of hydrogen under superatmospheric pressures in the cracking stage has the advantage that the formation of coke otherwise readily occurring is successfully avoided. No substantial hydrogenation takes place in this cracking stage and the content in hydrogen of the treated products is lowered.

It is preferable to operate with a current of the hydrogenating gas, low partial pressure of the product to be improved, and accordingly with hydrogen in considerable excess. The amount of hydrogen employed in the second stage of the process may range from two to three cubic meters of hydrogen for each kilogram of carbonaceous material treated in said second stage. If the parent material of the first stage of the process is not especially high in hydrogen, the same quantity of hydrogen may be employed in this stage as in the second stage. On the other hand, if the parent material contains a high content of hydrogen, the amount of added hydrogen employed in the first stage may be as low as from about 1.5 to 2.5 cubic meters of hydrogen for each kilogram of carbonaceous starting material.

The materials under treatment are brought into intimate contact with the hydrogenating gas and the contacts, for example by atomization, conversion into mist, or spreading in thin layers.

In case solid carbonaceous materials are to be converted according to the present invention these are finely ground and pasted up with heavy oils and then passed through reaction vessels in which the catalysts are rigidly arranged and so as leave enough large space for allowing the paste of coal and oil to pass therethrough.

The present invention will be further illustrated with reference to the accompanying drawing showing in a diagrammatic fashion a side elevation partly in section of an apparatus especially suitable for carrying out the process according to the present invention in the vaporous phase.

Referring to the drawing in detail fresh gas is introduced by means of compressor 4 and pressure valve 5 into pipe 3 where it is joined with the vapors of middle oil heated to about 325° C. and which is introduced by way of pump 8, pipe 1 and valve 2. The mixture is preheated in the preheater 6 to the reaction temperature and then passed by way of pipe 7 and valve 9 at inlet 10 into the first reaction vessel 11 which is filled with a splitting catalyst 12. The splitted products leave the reaction vessel 11 at 13 and pass by way of pipe 14, pressure valve 15 and preheater 16 at inlet 17 into the second reaction vessel 18 which is filled with a hydrogenating catalyst. The hydrogenated products leave the reaction vessel 18 at 20 and pass by way of pipe 21 and valve 22 into the condenser 23, thence into the stripping vessel 24 where the liquid products are separated from the vaporous products. The vapors may be withdrawn through pipe 25 and returned to the process by way of circulatory pump 26 and pipe 27. The liquid products collected in the stripping vessel 24 may be withdrawn at outlet 28.

The following examples will further illustrate how the said invention may be carried into practical effect but the invention is not limited to these examples.

*Example 1*

Brown-coal tar middle oil, boiling at from 200° to 325° C., is injected into a vertical reaction vessel the hot zones of which are lined with aluminium, and brought in the liquid state into intimate contact with an excess of hydrogen, in a counter current, at 200 atmospheres pressure and a temperature of 450° C. in the presence of active charcoal. The products, which have suffered extensive decomposition but are still highly unsaturated, are then treated, in the state of vapor, and at the same temperature, with a cobalt catalyst and thereby hydrogenated. Instead of cobalt, a charcoal prepared by calcining humus charcoal may be employed as the hydrogenation contact mass. The product obtained on cooling the vapors issuing from the reaction vessel is a liquid, about 90 per cent of which consists of practically saturated benzine, containing merely traces of sulfur, and being suitable for use as engine fuel without refining. The hydrogen is maintained in circulation, without loss of pressure, by pumping, the amount consumed being replaced.

*Example 2*

A suspension consisting of 1 part of dry brown coal, low in bitumen, and 1 part of viscous mineral oil, is treated continuously, in the liquid state, at about 420° C. and 200 atmospheres pressure, with an excess of hydrogen and in the presence of bauxite, in a reaction apparatus the hot zones of which are constructed of high-grade chromium-nickel steel, care being taken to keep the substances participating in the reaction thoroughly mixed by stirring. The resulting products are treated in a similar manner with a molybdenum catalyst. When the hydrogeniferous vapors discharged from the reaction vessel are cooled, a liquid product is obtained consisting of about 20 per cent of benzine and 70 to 80 per cent of intermediate oils, the coal being almost completely liquefied. The intermediate oils may be subjected to further treatment for complete conversion into benzine.

What we claim is:

1. The process for the thermal conversion of hydrocarbon products into lower boiling hydrocarbons, which comprises treating a middle oil introduced in the liquid state with an excess of hydrogen at a pressure of about 200 atmospheres, and at a temperature of about 450° C. in the presence of active charcoal to produce lower boiling products containing substantial amounts of unsaturated hydrocarbons and then treating the products thus obtained in the state of vapour and at the same temperature and pressure with a cobalt catalyst and an excess of hydrogen.

2. The process for the thermal conversion of hydrocarbon products into lower boiling hydrocarbons which comprises treating a suspension consisting of 1 part of dry brown coal, low in bitumen and 1 part of mineral oil in the liquid state with an excess of hydrogen at a pressure of about 200 atmospheres and at a temperature of about 540° C. in the presence of bauxite to produce lower boiling products containing substantial amounts of unsaturated hydrocarbons and then treating the products thus obtained under similar conditions with a catalyst comprising molybdenum.

3. The process of producing substantially saturated low boiling hydrocarbons from combustible carbonaceous materials by first converting said materials into lower boiling products containing substantial amounts of unsaturated hydrocarbons by treating said materials with an excess of added hydrogen at a temperature of from about 400 to 700° C. in the presence of a catalyst having predominantly cracking properties selected from the class consisting of aluminum, silicon, copper-iron mixtures, mixtures of compounds of these metals, porous carbon, active silica, hydrosilicates, alumina and magnesia, and then subjecting the so obtained hydrocarbons to a temperature ranging from about 300 to 600° C., and a pressure of at least 20 atmospheres in the presence of a cataylst having predominantly hydrogenating properties selected from the class consisting of cobalt, molybdenum, tungsten, and compounds of these metals and with an excess of added hydrogen to cause an extensive hydrogenation of said unsaturated cracked materials.

4. The process as defined in claim 3 wherein both the first and second stages are effected under a pressure of at least 20 atmospheres.

5. The process as defined in claim 3 wherein both stages are effected with streaming hydrogen and low partial pressure of the materials converted in said stages.

CARL KRAUCH.
MATHIAS PIER.
WALTER SIMON.